United States Patent [19]

Volk

[11] Patent Number: 4,608,898

[45] Date of Patent: Sep. 2, 1986

[54] SAW GUIDE AND MITER APPARATUS

[76] Inventor: Michael J. Volk, 216 McKeon Rd., Severna Park, Md. 21146

[21] Appl. No.: 680,912

[22] Filed: Dec. 11, 1984

[51] Int. Cl.⁴ ............................................. B27B 11/04
[52] U.S. Cl. ....................................... 83/745; 83/581; 83/767; 269/1
[58] Field of Search .............. 83/745, 581, 574, 486.1, 83/471.3, 767; 269/1, 88, 41

[56] References Cited

U.S. PATENT DOCUMENTS

| | | | |
|---|---|---|---|
| 2,633,162 | 3/1953 | Neuenschwander | 83/471.3 X |
| 2,656,860 | 10/1953 | Thayer | 83/471.3 X |
| 2,823,709 | 2/1958 | Konieczka | 83/745 |
| 2,876,808 | 3/1959 | Lindheim | 83/471.3 |
| 3,304,967 | 2/1967 | Kujan | 83/486.1 |
| 4,202,233 | 5/1980 | Larson | 83/745 |
| 4,300,426 | 11/1981 | Weaver | 269/41 X |
| 4,328,728 | 5/1982 | Ferdinand et al. | 83/471.3 |

Primary Examiner—Frank T. Yost
Attorney, Agent, or Firm—Brady, O'Boyle & Gates

[57] ABSTRACT

A unitized saw guide and protractor assembly includes workpiece locator tabs whereby the assembly and workpiece can be hand-held safely for making a precision workpiece cut at a required angle by means of a saber saw. The same saw guide and protractor assembly is employed with a platform on which the assembly rests with its workpiece locator tabs engaged within slots of the platform which lock the assembly and platform together in a precision use mode to create a miter box, said tabs again contacting and positioning a hand-held workpiece for cutting. The saw guide and protractor assembly is used in a third mode with a vise equipped framing base as a miter machine where again the locator tabs engage a face of the workpiece to position the saw guide and protractor assembly with precision. A simplified highly versatile and very economical apparatus is achieved.

17 Claims, 19 Drawing Figures

SAW GUIDE AND MITER APPARATUS

BACKGROUND OF THE INVENTION

The prior art contains numerous and diverse teachings pertaining to guides for power saws including protractor equipped guides generally employing a protractor having a 180° adjustment range. Various forms of miter boxes, miter vises and mitering machines are also known. This prior art equipment in quality brands is quite expensive and the woodworking hobbyist or professional, such as a commercial framer, must make a substantial investment in several different pieces of equipment to satisfy even the most common needs for making precision cuts on workpieces, miter cuts and miter machine operations required for manufacturing quality frames.

Much of the prior art equipment is suitable only for processing plain or flat rectangular workpieces and is not capable of handling cove molding and angular faced picture framing stock. This requires a user to invest further in specialized equipment for these purposes.

In view of these and other well-known deficiencies in the prior art, the present invention seeks to provide several simplified and comparatively low cost equipment components which are employed separately and together in unique directly coacting modes to satisfy completely the major needs of hobbyists and professionals in performing precision cuts on workpieces, diverse miter box operations, and complete mitering machine operations of the types required in the manufacture of quality picture frames and the like.

The apparatus in accordance with the invention additionally has the capability of cutting cove molding and angular faced framing stock. It can also cut tubing stock. The apparatus is particularly designed for use with saber saws and its guideway protractor assembly is adjustable to accommodate various saber saw models whose slide plates may vary in width. Furthermore, the invention does not preclude independent use of the saw away from the apparatus whenever desired. The apparatus enables more precise, faster and smoother cuts without chattering of the workpiece in comparison to the prior art. The apparatus is also designed for minimal wear over long periods of use and it enables virtually instant set-up for whatever use is required at a given time.

A further feature of the invention is that the saw guide and protractor assembly employed in all modes of use according to the invention is constructed to allow dual angle cuts on workpieces by a saber saw.

According to one aspect of the invention, the unitized saw guide and protractor assembly is used alone for producing precision angle cuts on workpieces while the same are safely hand-held in contact with spaced locator tabs on an approximate 45° protractor sector which is hinged to one side of the saw guideway in substantially a common plane therewith. In a second use mode, the same assembly is interlocked through its locator tabs with a platform to form a miter box wherein a workpiece is safely hand-held against the locator tabs to allow precision cutting without play or workpiece chattering. In a third use mode, the unitized guide and protractor assembly is used with a vise equipped framing base to provide a complete miter machine wherein frame components are cut at precision angles following which they are held for joining with glue, nails or screws. Again, during the cutting operations in the miter machine, the locator tabs of the guide and protractor assembly engage the workpiece and serve to properly position the guide and protractor assembly relative thereto for cutting while the workpiece is being held in a vise of the miter machine.

The above and other features and advantages of the invention over the prior art will be apparent to those skilled in the art during the course of the following description.

BRIEF DESCRIPTION OF THE DRAWINGS

FIG. 14 is a plan view of the framing base in use to complete the joining of two frame components following removal of the saw guide and protractor assembly.

FIGS. 15A through 16 are views illustrating the various cuts which can be made on cove molding by means of the miter machine depicted in FIGS. 10 through 13.

DETAILED DESCRIPTION

Referring to the drawings in detail wherein like numerals designate like parts, FIGS. 1-4 illustrate a unitized adjustable saw guide and protractor assembly forming a basic component of the complete apparatus and employed in three different operational modes, which will be fully described. The saw guide and protractor assembly comprises a linear guideway 20 for any conventional saber saw 21 having a slide plate 21a. The guideway 20 consists of two spaced parallel opposing angle bar tracks, each having a bottom flange 22 lying in one plane and an outer side flange 23 at right angles to the bottom flange and rising therefrom.

Figure 1:
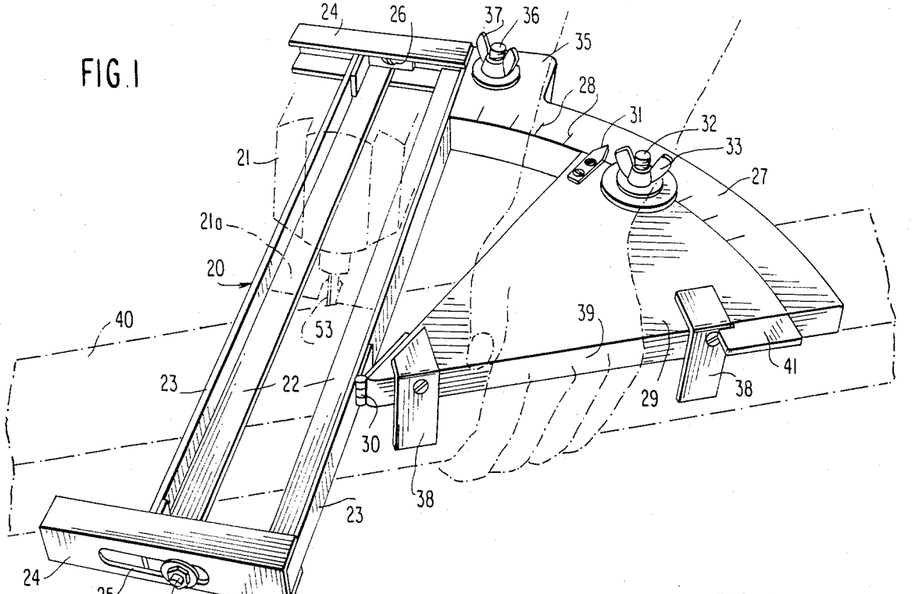
FIG. 1 is a perspective view of a saw guide and protractor assembly according to the present invention.
Figures 2, 3, 4:
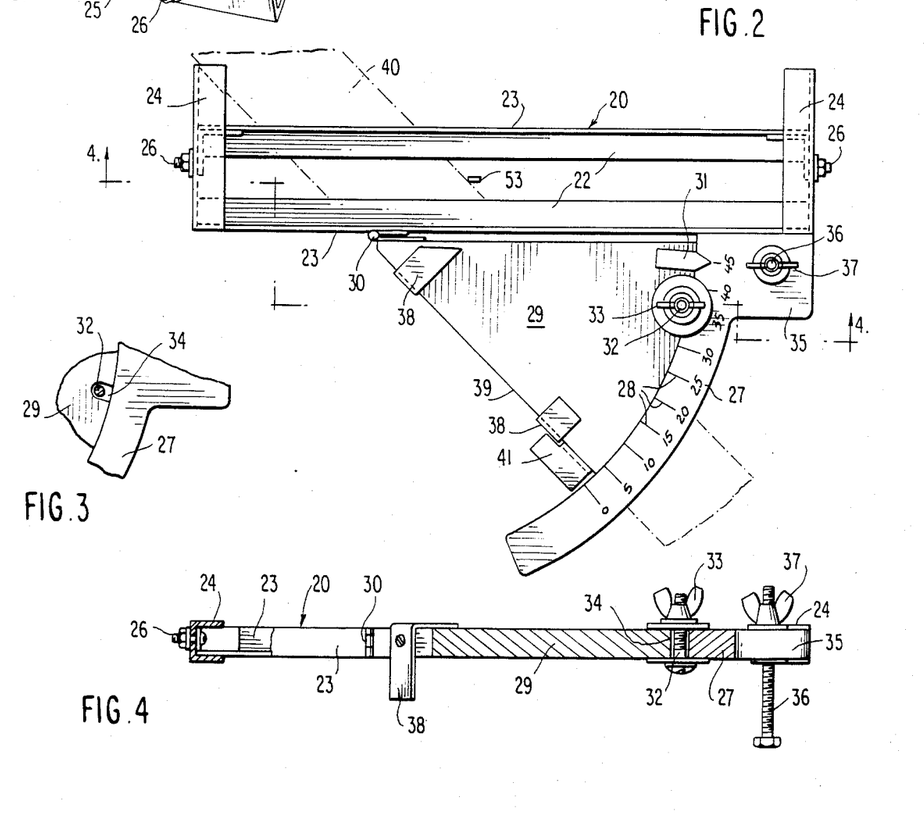
FIG. 2 is a plan view of said assembly in one adjusted mode.
FIG. 3 is a fragmentary plan view of protractor components.
FIG. 4 is a vertical section taken on line 4—4 of FIG. 2.
Figure 5:
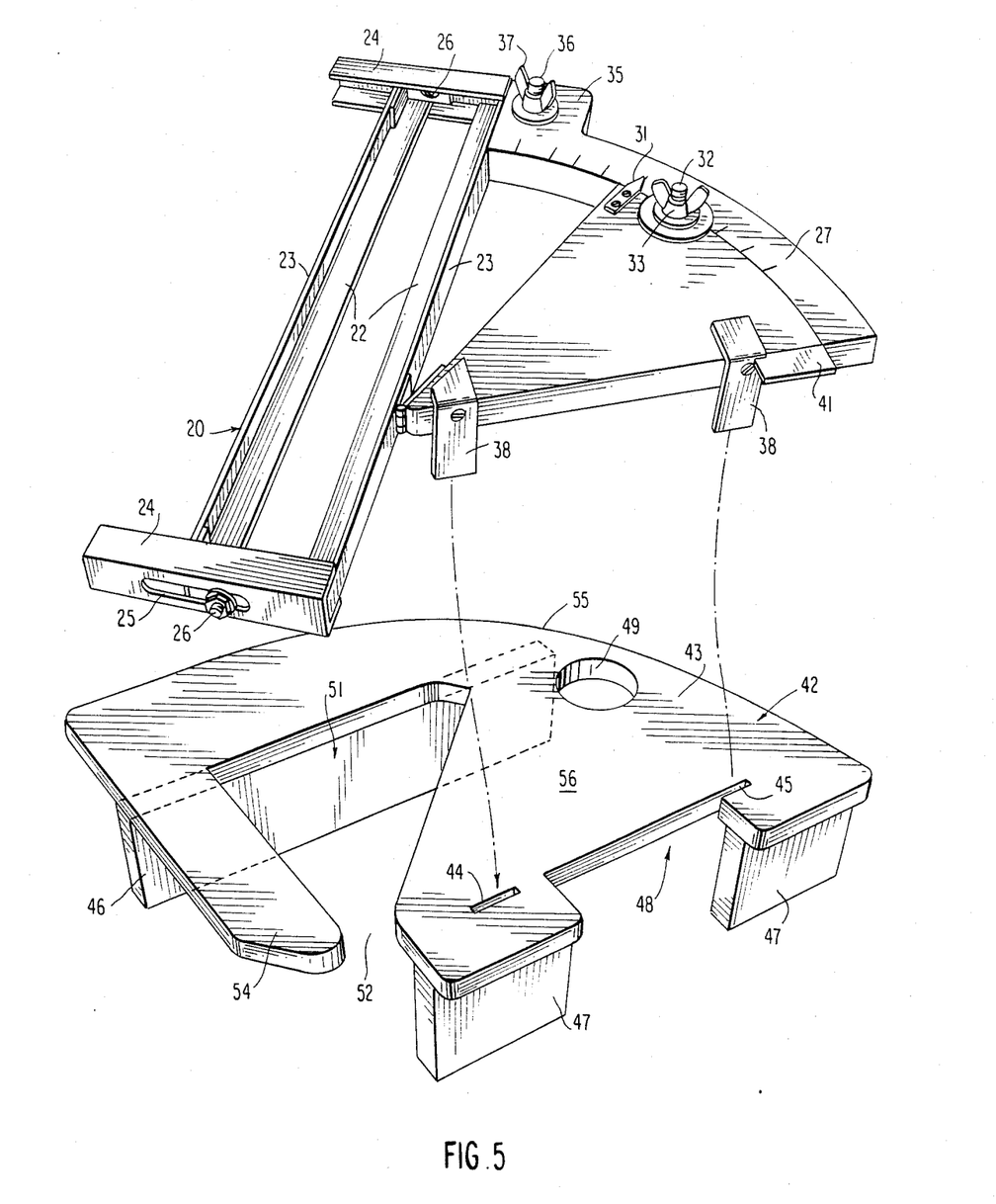
FIG. 5 is an exploded perspective view of the saw guide and protractor assembly and a platform used therewith to form a miter box.

The two angle bar tracks of the guideway 20 have their ends held in short channel members 24, each of which is provided with a longitudinal adjustment slot 25 for one angle bar track of the guideway 20, namely, the left side track as viewed in FIG. 1. The right side angle bar track in FIG. 1 has its ends fixed immovably to the channel members 24. Adjusting and clamping bolts 26 for the left side track of the guideway 20 are secured to the left side track and engage the adjusting slots 25, as indicated. This feature allows the linear guideway 20 to receive and guide the slide plate 21a of any make or model of saber saw.

Rigidly secured to one end portion of the flange 23 of the right side angle bar track, FIG. 1, is an arcuate protractor arm 27 having protractor angle graduations 28 visibly marked thereon preferably from 0° to 45°, as shown. The protractor arm has a thickness equal to the height of the adjacent flange 23 and the bottom faces of the guideway 20 and protractor arm 27 lie in a common flat plane for an important reason to be explained.

A coacting protractor sector plate 29 having the same thickness as the protractor arm 27 is connected by a hinge 30 at its apex to the flange 23 of the right side angle bar track, FIG. 1. The arcuate edge of the sector plate 29 spans approximately 45° and near one side edge of the sector plate 29 a protractor pointer 31 is attached to coact with the angular graduations 28 on the protractor arm. The arm 27 and plate 29 are releasably locked in a selected adjusted position by a clamping bolt 32 carrying a clamping wing nut 33, the bolt 32 being received through a notch 34, FIG. 3, formed in the arcuate edge of the sector plate 29.

The protractor arm 27 carries an enlargement 35 at its end which is connected to the guideway 20. This enlargement is apertured to receive therethrough an adjustable support or stabilizing post 36 in the form of a bolt, whose use will be described. The axis of this post or bolt is perpendicular to the common plane occupied by the bottom faces of the arm 27, sector plate 29 and the saw guideway 20. A locking wing nut 37 for the bolt or post 36 is provided so that the effective length of the post can be established, followed by secure locking of the same relative to the enlargement 35.

A key feature of the invention coming into play in all of its modes of use comprises a pair of spaced parallel thin substantially rigid locator tabs 38 fixed to the edge 39 of protractor sector plate 29 and being perpendicular to the plane occupied by the bottom face of the sector plate 29 and projecting below this plane, as illustrated. The spacing of the locator tabs 38 defines a hand hold area where a user of the assembly can grasp with one hand between the locator tabs 38 a workpiece 40 requiring cutting and can hold the top of the workpiece in firm contact with the common bottom face of sector plate 29, protractor arm 27 and saw guideway 20, while simultaneously firmly maintaining one longitudinal edge of the workpiece 40 against the locator tabs 38 which define a fence for the workpiece 40.

By prior adjustment of the protractor relative to the guideway 20 and locking of the protractor by the clamp bolt 32 in the selected adjusted position, the user may safely and cleanly cut the workpiece at a required precision angle by moving the saber saw 21 along the guideway 20 with the other hand. The assembly is constructed so that it is virtually impossible for the hand or fingers of the hand grasping the workpiece 40 to enter into the path of movement of the saw blade and thus the assembly is very safe to use. Due to the fact that the saber saw blade cuts on the upstroke only, the cutting action actually assists in maintaining the top face of the workpiece 40 in firm contact with the common flat bottom face or plane of the assembly defined by the guideway 20 and the two protractor elements 27 and 29. As a result of this arrangement chattering of the workpiece during sawing is eliminated which promotes precision as well as speed and smoothness in the cutting or sawing process. Various widths and thicknesses of lumber or other workpieces can be cut at precision angles within the range accommodated by the protractor structure, this range including all of the commonly used angles.

The adjustable post 36 does not come into play in the first mode of use of the saw guide and protractor assembly, above described.

Preferably, the protractor sector plate 29 is further equipped with a small rigid lifting tab 41 near one locator tab 38 and projecting outwardly from the edge 39 of the sector plate, as shown. The lifting tab 41 is used primarily in the other use modes of the guide and protractor assembly, yet to be described, to assist in separating the assembly from other components of the apparatus.

FIGS. 5 to 8 of the drawings depict a miter box embodiment of the invention which employs the previously-described saw guide and protractor assembly of FIG. 1 in conjunction with a platform or table 42 in a second use mode. More particularly, the flat bottom face of the guide and protractor assembly is received in contact with a flat top face 43 of the platform 42 and the two locator tabs 38 are simultaneously received within locator slots 44 and 45 of the platform 42. This firmly locks the guide and protractor assembly against movement in any direction within the common plane defined by the top face 43 of the platform and the bottom face of the saw guide and protractor assembly. The latter assembly can always be lifted from the platform 42 and the lifting tab 41 assists in this lifting or separation whenever desired.

The plate-like top panel of platform 42 is secured near one side of the platform to a depending perpendicular support plate or web 46 while two spaced depending plate-like support legs 47 are similarly secured dependingly to the platform top wall near its other side. The legs 47 are of the same height as the support web 46 so that the platform 42 can rest with stability on a level support surface. The platform 42 is recessed at 48 between the support legs 47 to provide a hand grip space. An opening 49 in the platform top wall provides a clearance space for the head of clamping bolt 32 when the saw guide and protractor assembly is placed on the platform 42. The space beneath the top wall of platform 42 and between the support web 46 and legs 47, FIG. 8, defines a passageway for a workpiece 50 in a fairly wide range of thicknesses and widths. The two locator tabs 38 project well below the bottom face of the platform top wall, as shown in the drawings, and both tabs engage one longitudinal edge of the workpiece 50 and define a fence or support surface therefor while the workpiece and the protractor sector plate 29 are being gripped by one hand of the user in the manner illustrated in FIG. 8, with the top wall of the platform 42 firmly sandwiched between the top face of the workpiece 50 and the flat bottom surface or plane of the saw guide and protractor assembly. It should be noted that another key feature of the invention, rendering the multiple use modes of the invention possible, is the placement of the bottom faces of the saw guideway 20 and protractor components 27 and 29 in a common flat plane, as previously described. In much of the prior art, the protractor components occupy a different plane from that in which the saw guide structures are located, rendering such devices virtually useless for some of the operations enabled by the present invention.

Figure 6:
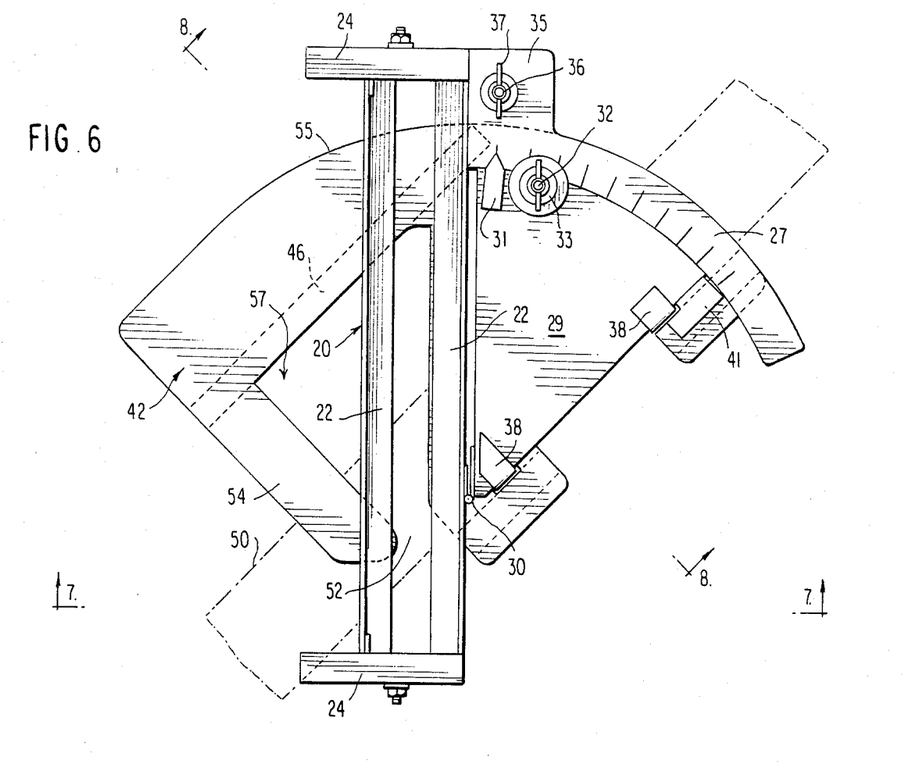
FIG. 6 is a plan view of the miter box formed by the assembly of the components in FIG. 5.
Figure 7:
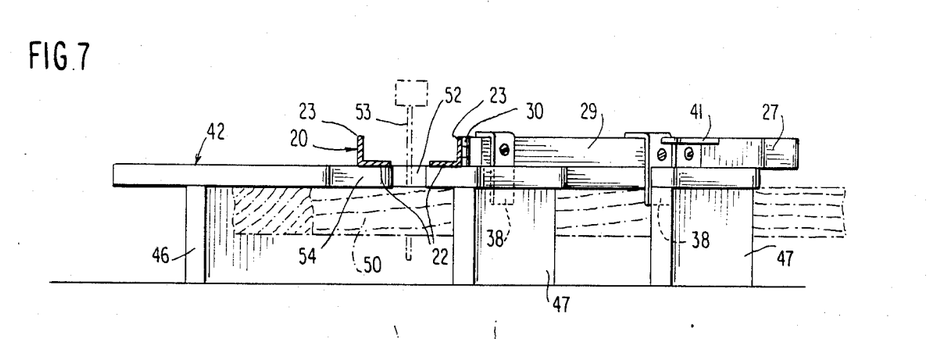
FIG. 7 is a vertical section taken on line 7—7 of FIG. 6.
Figure 8:
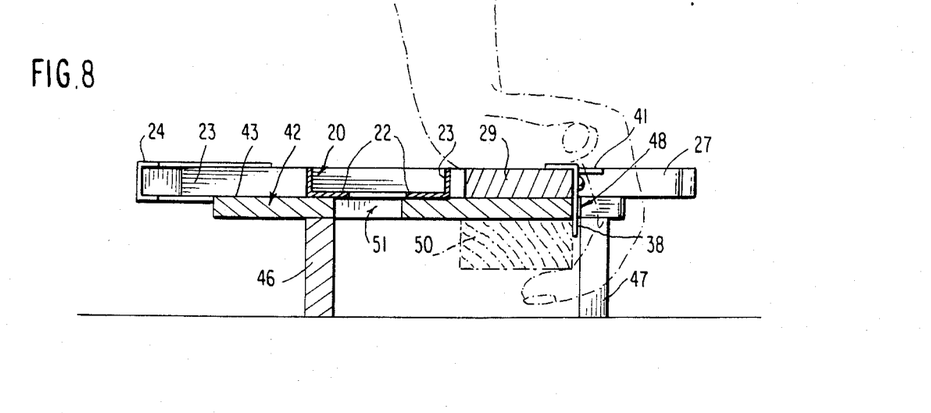
FIG. 8 is a vertical section taken on line 8—8 of FIG. 6.

The top wall of platform 42 has a rather large approximately triangular opening 51 formed therethrough including a relatively narrow outlet opening 52 to provide an adequate passageway for the saber saw blade 53, FIG. 7, in all adjusted positions of the saw guide and protractor assembly. The provision of the opening 51 defines on the top wall of the platform 42 and across the top of the workpiece passageway a stabilizing support arm 54 which underlies and supports the end portion of the saw guideway 20 which is remote from the protractor arm 27, while simultaneously engaging and stabilizing the top face of the workpiece 50 while it is being cut by the upward strokes of the blade 53. This particular platform configuration allows the user of the miter box through one hand to firmly hold the workpiece in contact with the locator tabs 38 and with the flat bottom face of the platform top wall during the making of a precision saw cut at any required angle without chattering or vibration of the workpiece or other elements. An extremely compact and efficient, as well as convenient and safe miter box is created by the described assembling and coacting usage of the saw guide and protractor assembly in FIG. 1 with the platform 42 shown in FIG. 5. It can be further noted that for the sake of appearance and conservation of material the margin of the platform top wall is made arcuate at 55 to match the curvature of the protractor arm 27, as best seen in FIG. 6. The protractor sector plate 29 rests upon the roughly triangular portion 56, FIG. 5, of the platform top wall between the opening 51 and hand grip recess 48.

Figure 9:
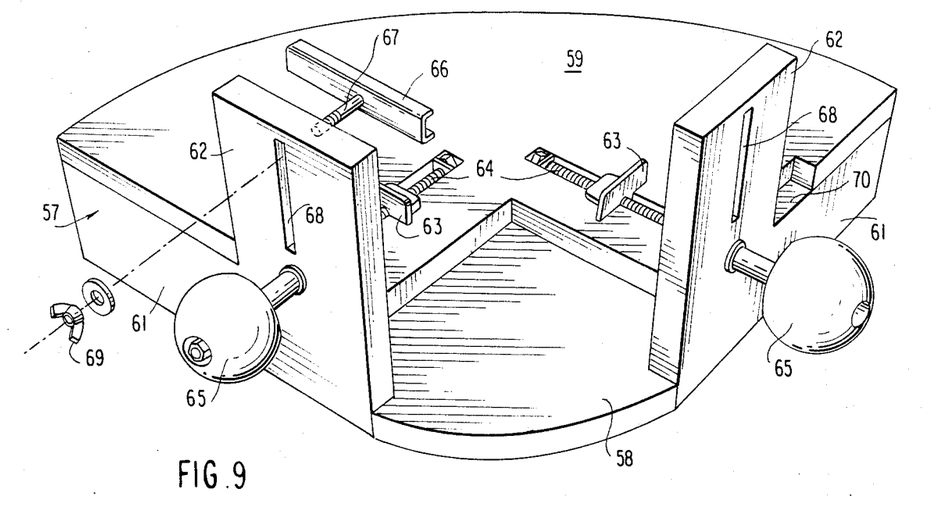
FIG. 9 is a perspective view of a vise equipped framing base.

As depicted in FIGS. 9 through 14, the saw guide and protractor assembly of FIG. 1 is employed in a third use mode with an underlying vise equipped framing or miter machine base 57 shown isolated in FIG. 9. This base preferably includes a flat bottom wall 58 and a somewhat elevated parallel superposed flat top wall 59 adapted to receive and support a workpiece 60 or workpieces, as in FIGS. 12, 13 and 14. The top and bottom walls 58 and 59 are rigidly interconnected in spaced relationship by side walls 61 having integral rising work fence extensions 62 which project well above the upper surface of top wall 59. The saw guide and protractor assembly, when placed upon the framing base 57, FIGS. 10 through 14, has the workpiece 60 or workpieces sandwiched in between the flat top face of the base 57 and flat bottom face of the guide and protractor assembly. Therefore, that assembly is spaced above the base 57 by a distance defined by the thickness of the workpiece, which is a variable. In any case, one end portion of the saw guideway 20 occupies the space between the two work fence extensions 62. The aforementioned adjustable bolt or post 36 is now utilized to stabilize the far end of the saw guideway and protractor through contact with the top wall 59 of the base 57. The adjustment of the post 36 need not be precise to achieve the required stability of the apparatus.

The two locator tabs 38 again come into play in a third operational mode of the saw guide and protractor assembly in cooperation with the base 57 to form a miter machine for making framing, etc. The two tabs 38 engage one longitudinal edge of the workpiece 60 whether a plain flat workpiece or a section of cove molding or the like, on opposite sides of the fence extension 62, as illustrated in the drawings.

Figure 10:
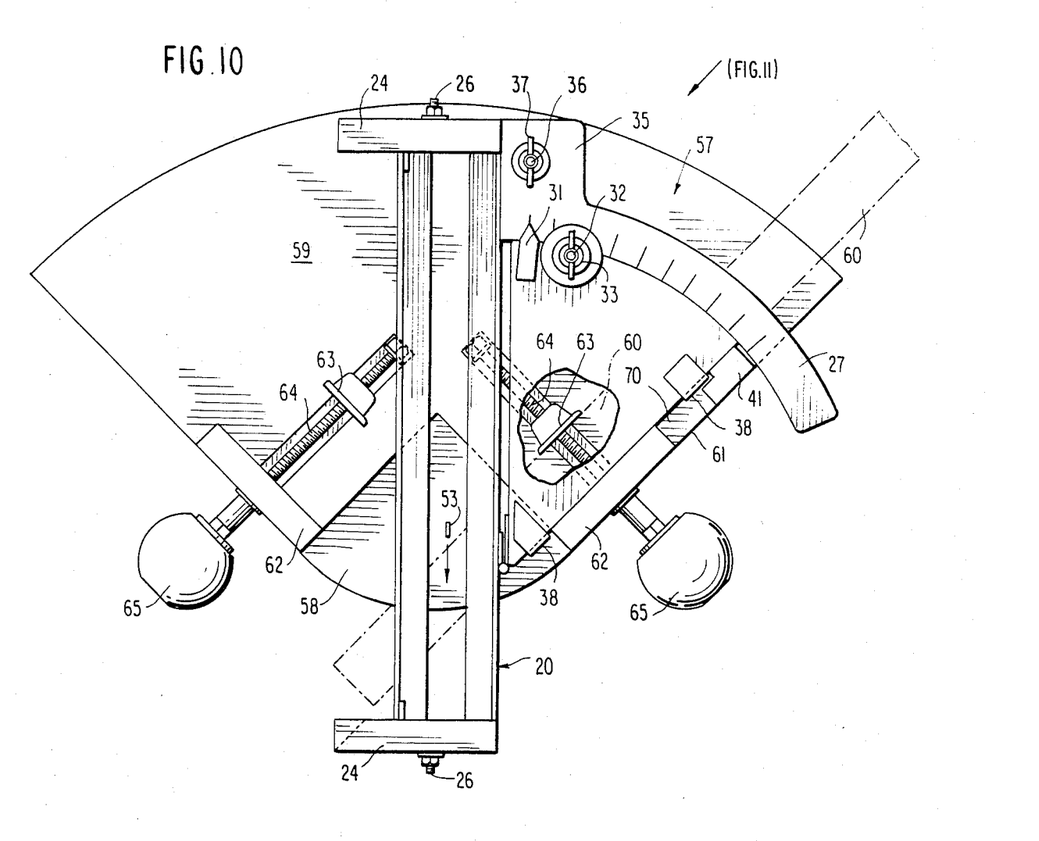
FIG. 10 is a plan view of a miter machine consisting of the base shown in FIG. 9 and the saw guide and protractor assembly of FIG. 1.

The base 57 is equipped with two right angular vises, each having a workpiece engaging adjustable jaw 63 arranged in opposing relationship to the two fence extensions 62 and clampingly engaging the other longitudinal edge of the workpiece 60, FIG. 10, to secure it firmly against the fence extension. The vise jaws 63 are driven by screw shafts 64 having turning knobs 65 arranged outwardly of the fence extensions 62.

The base 57 is additionally equipped on the inner faces of extensions 62 with two vertically adjustable clamp bars 66 carrying threaded studs 67, received in adjusting slots 68 of fence extension 62, whereby the clamp bars 66 can be raised and lowered relative to the top wall 59 of base 57. The studs 67 carry clamping wing nuts 69 which engage the outer faces of extensions 62, and serve to releasably lock the clamp bars 66 in adjusted use positions.

A recess 70, FIG. 9, is provided in the platform top wall 59 at one side of the adjacent extension 62 to receive the adjacent locator tab 38 when a thin workpiece, typically flat stock, is being cut. When thicker work, such as the cove molding 60, is being processed, the tabs 38 are at a greater elevation relative to the base 57, FIG. 13, and the recess 70 which is merely a tab recess clearance does not come into play.

Figure 11:
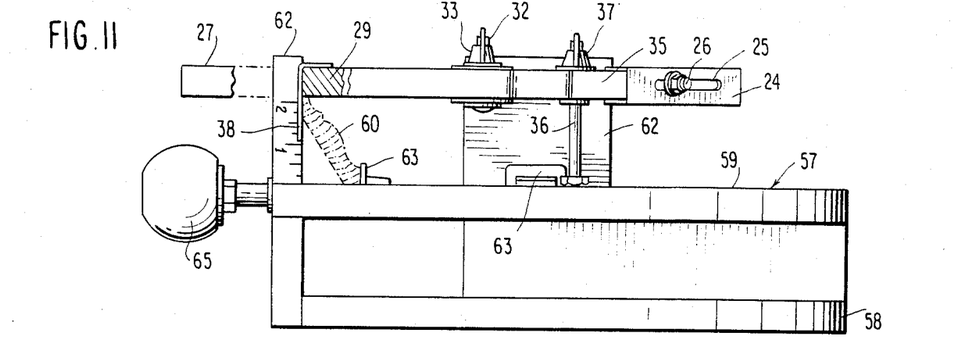
FIG. 11 is an elevational view of the miter machine in FIG. 10 taken in the direction of the arrow in FIG. 10.
Figure 12:
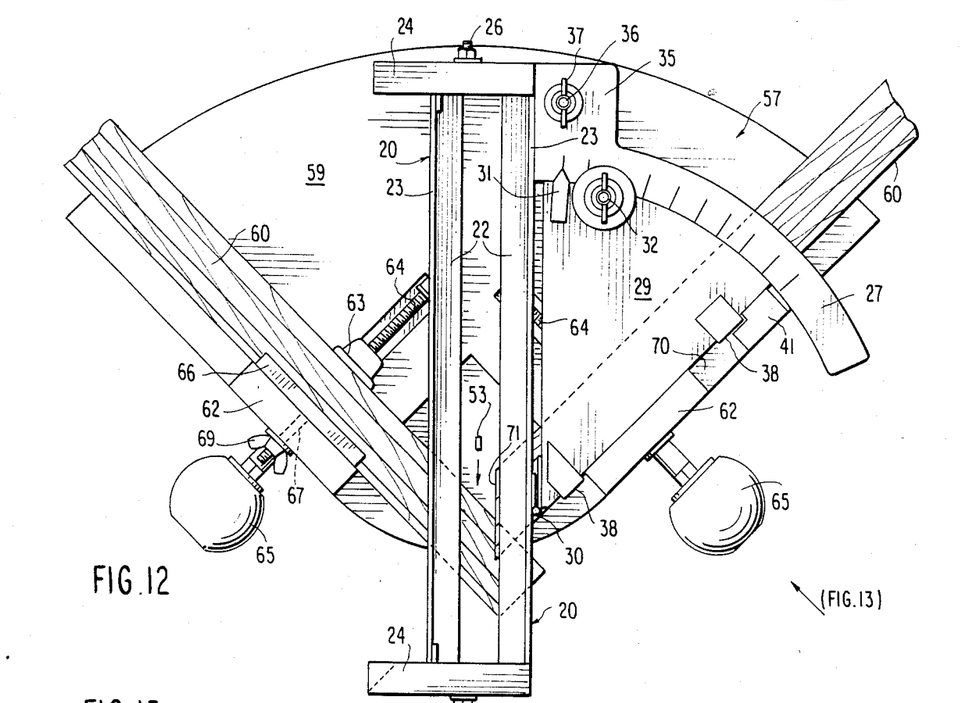
FIG. 12 is a plan view of the miter machine depicting its use for making miter cuts on two workpieces.

FIGS. 10 to 13 show the use of the miter machine composed of the base 57 and the saw guide and protractor assembly for making miter cuts on cove molding or picture framing. The guide and protractor assembly is always placed as shown in FIGS. 10 and 12 with the protractor arm 27 to the right of saw guideway 20 and the locator tabs 38 to the right. In this situation, the locator tabs 38 are actually positioning or locating the saw guide and protractor assembly with precision relative to the clamped workpiece 60 on the right-hand side, FIGS. 10 and 12. The angle of the guideway 20 is adjusted relative to the axis of the workpiece 60 and then is locked by means of the clamping bolt 32 in the selected adjusted position which establishes the miter cut angle on the workpiece 60, FIG. 11. The miter cut is then made with a saber saw to produce a precision angle end face 71 on the workpiece 60 shown in FIG. 10 and also shown in FIG. 12 after cutting.

During this cutting of the workpiece 60 shown in FIG. 10, the adjacent clamp bar 66 is not required and is not used because the top surface of the workpiece, whether plain stock or cove molding or thick or thin, is held down and stabilized during cutting by the flat bottom face of the saw guide and protractor assembly.

The workpiece 60, FIG. 10, after cutting to produce the angled end face 71 is retracted longitudinally from the path of the saw blade and a second workpiece 60, namely the left side workpiece in FIG. 12, is then cut on the identical miter angle by the saber saw without changing the setting of the protractor or changing the angle of the saw guideway 20. During the cutting of the left-hand or second workpiece 60, FIGS. 12 and 13, the adjacent clamp bar 66 is required to engage the top face of the workpiece, whether molding or plain lumber or other material, because the guide and protractor assembly cannot serve to engage and stabilize the left-hand or second workpiece 60.

Figures 14, 15A, 15B:
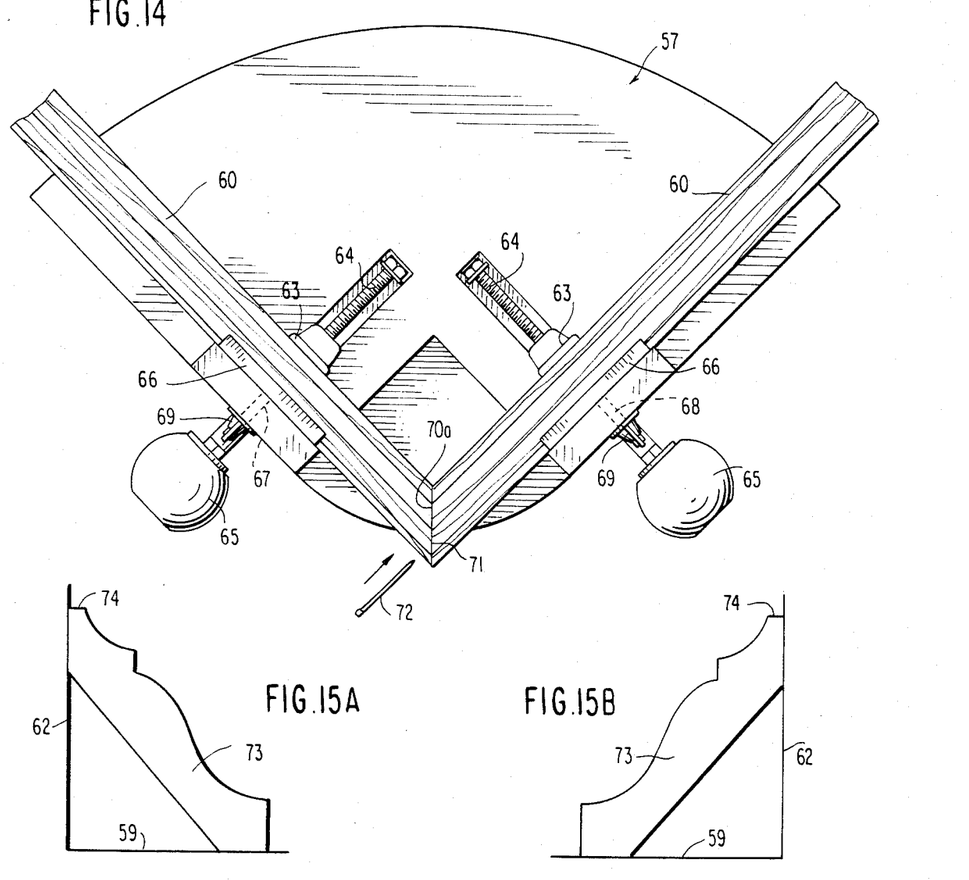

After the miter cutting of the second workpiece 60 to form a precision angle end face 70a, FIG. 14, which is an exact match with the previously cut end face 71, the guide and protractor assembly is lifted from the base 57 and set aside. Referring to FIG. 14, the two cut workpieces 60 are adjusted so that their end faces 71 and 70a are in exact registration. The two clamping jaws 63 are then tightened against the workpieces to hold them, and both vertically adjustable clamp bars 66 are adjusted to engage the top faces of the workpieces solidly during their permanent joining with glue, screws or by nailing, as indicated at 72 in FIG. 14. The same procedure prevails regardless of whether the workpieces are plain flat stock, cove molding or even tubing. After permanent joining, the clamp jaws 63 and bars 66 are released and the joined workpieces 60 which may be picture frame members are removed from the apparatus.

It should now be clear that the present invention in its totality provides an equipment kit for the woodworking hobbyist or professional which can take the place of three or more expensive separately used prior art machines, at only a fraction of the combined cost of such machines. Furthermore, the several apparatus components forming the equipment kit in the present invention are utilized in a unique coacting manner in three different modes to perform all of the functions of the separate prior art machines with much greater convenience, greater precision and at significantly less cost.

The saw guide and protractor assembly of FIG. 1 is used alone by hand, as described, for making precision angle cuts on workpieces quickly and with little effort and smoothly. The locator tabs 38 play a critical role in this first mode of use of the guide and protractor assembly.

In the second mode of use, termed miter box use, FIGS. 5 through 8, the guide and protractor assembly is employed in association with the platform 42, as described, and again the locator tabs 38 play a critical role, in this instance a dual role of positioning the workpiece 50 and also locking the guide and protractor assembly to the platform 42 in a precise manner.

In the third use mode of the equipment, as a complete miter machine, FIGS. 9 to 14, the identical saw guide and protractor assembly is employed with the framing or mitering base 57 in the described manner to produce precision miter cuts for framing, etc. on a wide range of workpiece forms, followed by joining of the cut workpieces as described relative to FIG. 14. The total equipment kit or package is highly versatile and convenient to use and entirely eliminates the need for purchasing several separate expensive equipment components which do not and cannot work together in the manner of the present invention.

Figure 15C:
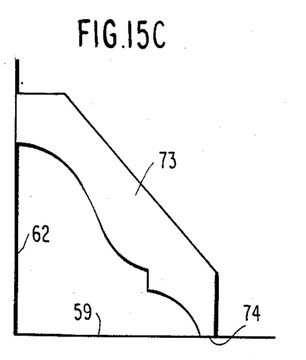
Figures 15D, 16:
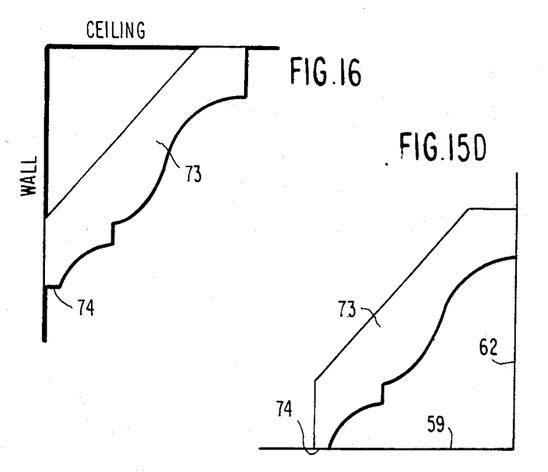

Finally, FIGS. 15A through 16 of the drawings are included to illustrate the diverse capabilities of the invention for processing cove molding. FIG. 15A depicts the placement of a cove molding section 73 in the apparatus to make a right side cut for an interior corner joint. The molding irregular face is up and the narrow edge 74 of the molding is upward at the time of cutting.

FIG. 15B shows the placement of the molding piece 73 in the equipment for a left side cut for an interior corner joint or a straight splice. Again, the profiled face of the molding and the narrow edge 74 is up.

FIG. 15C shows the cove molding placement for a right side cut for an exterior corner joint or straight splice. The profiled face of the molding and its narrow edge 74 are down.

In FIG. 15D, the molding 73 is positioned in the equipment for a left side cut for an exterior corner joint. With respect to the equipment in FIGS. 9 through 14 used to process the cove molding according to FIGS. 15A through 15D, it should be understood that FIGS. 15A and 15C reflect placement of the molding in the left-hand side of the equipment, FIGS. 10, 12 and 14, while FIGS. 15B and 15D show placement of the cove molding 73 in the right side of the equipment.

FIG. 16 merely illustrates the use of the cove molding along an interior corner defined by a wall and ceiling.

The profiled molding face and the narrow edge 74 are both down.

Figure 13:
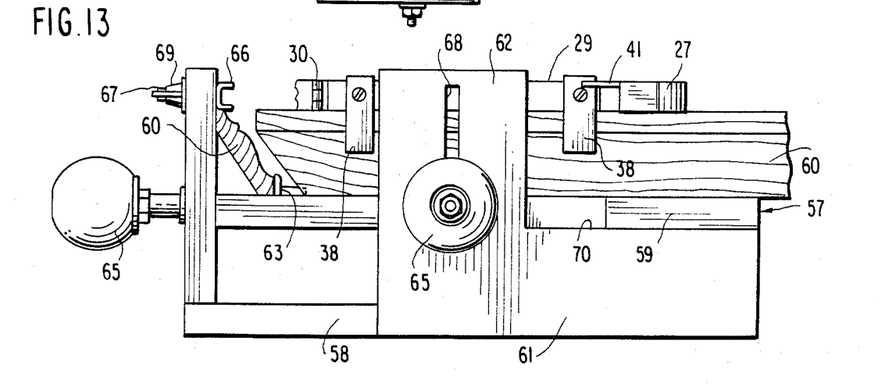
FIG. 13 is an elevational view of the miter machine taken in the direction of the arrow in FIG. 12.

From the foregoing it can be seen, referring particularly to FIGS. 11–13, that the locator Tabs 38, the inside face of the right fence extension 62, and the right, upper edge of the workpiece 60 positioned against the fence by the clamping jaw 63, form an automatic, firm self-securing operation for the saw guide portractor assembly for any size workpiece and desired angular cut.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. Apparatus for performing diverse cutting and joining operations on workpieces used for framing and the like comprising a unitized saw guide and protractor assembly in which saw guide and protractor components are hingedly joined, said assembly having a flat bottom face, and a pair of spaced locator tabs on said assembly extending below said flat bottom face and both lying in a common plane perpendicular to the flat bottom face of the assembly, whereby the assembly can be employed in a hand-held first use mode with said tabs in engagement with a workpiece while making a precision angle cut on the workpiece by a saber saw or the like engaged with the saw guide of said assembly, a miter machine base used and coacting with said saw guide and protractor assembly in another use mode with a workpiece sandwiched between a flat top face of said base and the flat bottom face of said assembly, at least a workpiece clamp on said base and an opposing work piece fence element whereby a workpiece can be securely held between a jaw of the clamp and an opposing face of the fence element, and said locator tabs of the saw guide and protractor assembly than contacting a longitudinal edge of the workpiece to position said assembly with precision on said base and relative to the workpiece.

2. Apparatus as defined in claim 1, and an adjustable and lockable stabilizing post element on said assembly adapted to engage said flat top face of said base.

3. Apparatus as defined in claim 2, and said base having a clearance recess in its top face to receive one of said locator tabs of said assembly when a thin workpiece is sandwiched between said assembly and said base.

4. A unified saw guide and protractor assembly for use alone in a first mode and for use with coacting components in second and third use modes, said assembly comprising a dual width adjustable track guideway for a saber saw or the like, an arcuate angle graduated protractor arm having one end secured to one track of the guideway near one end of the guideway and projecting away from one side of the guideway, a protractor sector plate having an apex hingedly attached to said one track of the guideway in spaced relationship to said one end of the protractor arm, said sector plate having an arcuate edge closely adjacent to one edge of the protractor arm and being movable therealong on the axis of said hinge attachment, a pointer on the sector plate to coact with the angle graduations on the protractor arm, means to lock the sector plate and protractor arm releasably in selected adjusted positions, and a pair of spaced locator tabs on one side edge of the protractor sector plate which is remote from said guideway and extending below the bottom face of the sector plate and lying in a common plane perpendicular to the bottom face of the sector plate, the bottom faces of the sector plate, protractor arm and said guideway lying in a common flat plane.

5. A unified saw guide and protractor assembly as defined in claim 4, and a height adjustable and lockable post element on the assembly near said one end of the guideway and projecting below said common flat plane.

6. A unified saw guide and protractor assembly as defined in claim 5, and a lift tab on the assembly and being spaced above said common flat plane and assisting in separating the assembly from coacting components.

7. A unified saw guide and protractor assembly as defined in claim 4, and a coacting platform for use with the saw guide and protractor assembly as a miter box and having a top wall with a bottom face and a flat top face adapted to be contacted by the flat bottom face of said assembly and having a saw blade clearance opening, said platform also having receptor slots for said locator tabs to releasably hold said assembly and platform in an assembled use relationship, and the locator tabs then extending below said top wall of the platform and forming a locating surface for a workpiece being hand held against the bottom face of said top wall of the platform.

8. A unified saw guide and protractor assembly as defined in claim 4, and a coacting miter machine base for use with said saw guide and protractor assembly as a miter and framing machine with a workpiece sandwiched between a flat top face of said base and the flat bottom face of said assembly, at least a workpiece clamp on said base and an opposing workpiece fence element on said base, and said locator tabs contacting one edge of the workpiece to position the saw guide and protractor assembly on the base with relation to the workpiece.

9. An apparatus adapted to serve substantially as a miter box comprising a unitized saw guide and protractor assembly having a flat bottom face and locator tab means on the assembly and extending below the flat bottom face in a common plane perpendicular to such face, and a coacting platform having a top wall with a bottbm face and a flat top face adapted to receive said flat bottom face of said assembly and having a saw blade clearance passage, the platform also having receptor slot means for said locator tab means to position said assembly in a proper use position on said platform, said locator tab means extending below said top wall of said platform and forming a locating surface for a workpiece being held against the bottom face of said top wall of the platform.

10. Apparatus as defined in claim 9, and said receptor slot means comprising spaced receptor slots, and said platform being provided at one side thereof with a hand grip recess between said receptor slots.

11. Apparatus as defined in claim 9, and said saw blade clearance passage defining on said platform a stabilizing support arm adapted to underlie a portion of the saw guide of said assembly while simultaneously engaging and stabilizing the top face of a workpiece being cut.

12. Apparatus as defined in claim 11, and said platform further comprising spaced support leg means defining a workpiece passageway through said platform below the top wall thereof.

13. Apparatus as defined in claim 12, and said leg means on one side of the workpiece passageway comprising spaced leg elements defining between them a hand grip passage leading into one side of the workpiece passageway.

14. A miter machine and framing apparatus comprising a saw guide and protractor assembly having a substantially flat bottom face and a pair of spaced locator tabs on the assembly extending below said flat bottom face and being disposed in a common plane perpendicular to such face, and a coacting miter machine base having a flat top face in underlying relationship to the saw guide and protractor assembly with a workpiece disposed between the base and said assembly, at least a workpiece clamp on said base and an opposing workpiece fence element on the base, and said locator tabs being adapted to contact one edge of a workpiece to position the saw guide and protractor assembly with precision on the base and relative to the workpiece.

15. A miter machine and framing apparatus as defined in claim 14, and said base being provided in its top face with a recess to receive one of said locator tabs when a thin workpiece is being processed.

16. A miter machine and framing apparatus as defined in claim 15, and a pair of workpiece clamps on said base in right angular relationship, and a pair of workpiece fence elements on said base in right angular relationship and being in opposing relationship to jaws of said workpiece clamps, said fence elements defining between them a clearance passageway for a saw guideway of said guide and protractor assembly, and height adjustable and lockable workpiece clamp bars on said fence elements and being adjustable at right angles to the movement paths of said jaws.

17. Apparatus for performing diverse cutting and joining operations on workpieces used for framing and the like comprising a unitized saw guide and protractor assembly in which saw guide and protractor components are hingedly joined, said assembly having a flat bottom face, and a pair of spaced locator tabs on said assembly extending below said flat bottom face and both lying in a common plane perpendicular to the flat bottom face of the assembly, whereby the assembly can be employed in a hand-held first use mode with said tabs in engagement with a workpiece while making a precision angle cut on the workpiece by a saber saw or the like engaged with the saw guide of said assembly, a coacting platform having a top wall having a flat top face adapted to abut the flat bottom face of said saw guide and protractor assembly and having a saw blade clearance opening formed through its top wall and a side hand grip recess, the platform also having a pair of receptor slots for said locator tabs of the assembly to releasably position the assembly for use in a second mode on and with the platform, the locator tabs then extending below said top wall of the platform and forming a precision locating surface for a workpiece being hand-held against the bottom face of said top wall of the platform with said top wall sandwiched between and in contact with the workpiece and the flat bottom face of said assembly.

* * * * *